J. BREWER.
Grain-Drill.

No. { 2,373, 33,377. }

Patented Oct. 1, 1861.

Witnesses:

Inventor:

UNITED STATES PATENT OFFICE.

JAMES BREWER, OF ALBANY, ILLINOIS.

IMPROVEMENT IN COMBINED HARROWS AND SOWERS.

Specification forming part of Letters Patent No. 33,377, dated October 1, 1861.

*To all whom it may concern:*

Be it known that I, JAMES BREWER, of Albany, in the county of Whiteside and State of Illinois, have invented certain new and useful Improvements in Combined Harrows and Sowers; and I do hereby declare the following to is a full, clear, and exact description thereof, reference being had to the accompanying drawings, forming part of this specification, and in which—

Figure 1:
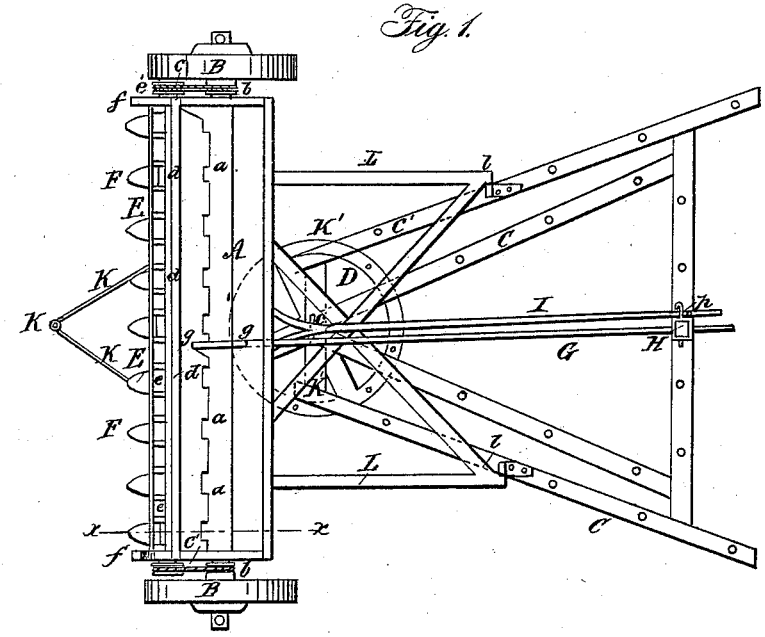
Figure 2:
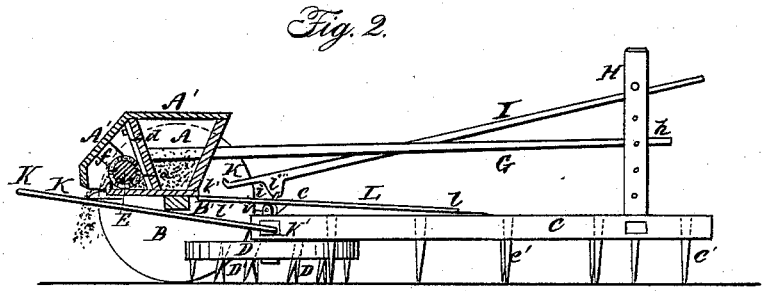

Figure 1 is a plan view, the cover to seed-box being removed to more fully show its action and operation; and Fig. 2, a side elevation of the harrow, the sower being shown in transverse section on line $x\ x$, Fig. 1.

To enable others skilled in the art to make and use my invention, I will proceed to describe its construction and operation.

In the drawings, A is the seed-box, supported on the axle B' of wheels B; C, the main harrow; C', its teeth. In the front of this harrow, at $c$, is the axis of a revolving harrow, D, which performs the office of throwing the stubble, stalks, &c., from the track of the main harrow. The revolution of the said harrow D is caused by its teeth, D', being set obliquely from its frame, so that in its forward movement the teeth on one side thereof stick into the ground, while on the other side they drag, as shown in the drawings.

E is a shaft, the surface of which is provided with a series of buckets, $e\ e$, and to which rotary motion is communicated through a belt or band, $c'\ c'$, running from pulleys $e'\ e'$ on each end of said shaft to similar pulleys, $b\ b$, projecting from the wheels B of the machine.

$a\ a$ are holes in the front of box A to permit the seed to run out to the buckets $e\ e$ on the revolving shaft E. The flow of said seed is regulated by gates $d\ d$, which can be lowered or raised in grooves, as shown.

A' is a door or cover to protect the seed from being blown away or from dust, &c., in their passage through the machine.

F F are a series of spreaders, which scatter the grain as it falls from buckets $e\ e$.

$f\ f$ are slots in the sides of the seed-box A to permit of the removal of the revolving shaft E if required.

The lever G is used to keep the sower level. When sowing on level ground the said lever is kept in the center of post H, as shown in the drawings; but in sowing up or down hill the lever is respectively raised or lowered and in ratio to the elevation or declivity of the hill. The lever I is connected to the front of the frame of the main harrow C by a link, $i$, hinged at $i'$ to said frame, and passing through a downwardly-projecting part, $i''$, of said lever. In the regular operation of the machine along a straight line this lever is at rest, as indicated in the drawings; but when the machine comes to the end of a field and is to be turned around it comes into use. The said lever is pushed forward until the notches $k\ k$ in its forked end will catch into the pointed lip $k'$ on the bottom of seed-box. The upper end of lever I is then depressed, which, as will be seen, forces up the sower off of the ground. If the lever is now fitted into the ratchet $h$ on the post H, the weight of the sower will raise the main harrow C off of the ground. Both sower and the main harrow now being off of the ground, resting on the center of revolving harrow D, allow it to be turned with greater ease and in its own circumference, thus gaining much space which it would be impossible otherwise to plant or harrow.

L is an iron frame, securely hinged at $l\ l$ to the main harrow, and at $l'\ l'$ to the seed-box, as shown in the drawings, to allow the compound motion to the seed-box and its frame, and for the purpose of shoving the sower.

The team is hitched at $k$ to the rods K K, which rods are securely fastened to the front of the main harrow at $k'\ k'$.

The operation is as follows: The box A is filled with grain, as represented in blue in the drawings, and the team started. Motion is communicated through pulleys $b\ b$ on the wheels B B through belts or bands $c'\ c'$ to pulley $e'\ e'$, shaft E, and buckets $e\ e$. They in their revolution from right to left take up the grain that has flowed out through regulating-gates $d\ d$ and bring it around and throw it off onto convex spreaders F F, whereby it is spread and dropped to the ground, as represented in the drawings in blue. The revolving harrow will then throw off from the seed any stalks, stubble, &c., that may be in their way, and the main harrow cover them up and pulverize the ground over them.

Having thus described my new and improved combined harrow and sower, what I claim as my invention, and desire to secure by Letters Patent, is—

1. The combination of main harrow C, revolving harrow D, and seed-box A with revolving shaft E, seed-buckets e e, and convex spreaders F F, substantially as and for the purposes set forth.

2. The combination of lever G with seed-box A and hinged frame L, substantially as and for the purpose set forth.

3. The combination of hinged lever I with seed-box A and its supporting-axle B' and wheels B B, substantially as and for the purposes set forth.

4. The combination of lever I, seed-box A, and main harrow C for elevating and turning the same upon the axis c of the harrow D, substantially as and for the purposes set forth.

In witness whereof I hereunto subscribed my name.

JAMES BREWER.

In presence of—
　S. M. PERKINS,
　W. A. CHAMBERLIN.